Patented Apr. 23, 1929.

1,710,181

UNITED STATES PATENT OFFICE.

GEORGE O. MORRISON, OF SHAWINIGAN FALLS, QUEBEC, CANADA, ASSIGNOR TO CANADIAN ELECTRO PRODUCTS COMPANY, LIMITED, OF MONTREAL, CANADA.

CONTINUOUS PROCESS FOR THE MANUFACTURE OF VINYL ESTERS.

No Drawing.   Application filed November 8, 1926.   Serial No. 147,194.

This invention relates to improvements in the manufacture of vinyl esters, and the object of the invention is to provide a continuous process for the manufacture of vinyl esters by the interaction of acetylene and carboxylic acids in presence of suitable catalysts.

It is known that acetylene in the presence of mercury compounds will combine with carboxylic acids to produce vinyl esters. In a copending application of Skirrow and Morrison, Serial Number 147,188, filed the 8th November, 1926, there is described a process of this character in which the catalyst is a mercury salt of ortho-phosphoric acid. During the course of the reaction, however, the mercury salt becomes reduced so that after a certain length of time the catalyst has to be renewed. It has been discovered that this cannot be done advantageously by merely adding to the reaction kettle during the course of the reaction the mercury salt of ortho-phosphoric acid. If the salt is merely added to the reaction mixture, the reaction proceeds, but the percentage of ethylidene diester produced greatly increases.

If, however, the catalyst is first treated with acetylene to the point where it just begins to produce vinyl esters and is then added to the kettle, the reaction may be made continuous and proceeds normally without any considerable production of ethylidene di-esters. In other words, it seems as if the desired active catalyst for the production of vinyl esters is not the mercury salt of a phosphoric or more particularly of ortho-phosphoric acid itself, but is the conversion product of this salt by its interaction with acetylene.

For the purpose, therefore, of carrying out the reaction in a continuous manner, the following is an example of the procedure adopted;—

3 parts of mercuric oxide is dissolved in 100 parts of hot glacial acetic acid. This material is kept at 80° or 90° C. and 2.4 parts of pure ortho-phosphoric acid of 98% to 100% concentration is added, with agitation. This material is then put into a suitable vessel connected to suitable refluxing and fractional condensation apparatus or to a continuous still, so arranged that acid and ester are separated and the acid refluxed to the reaction vessel. The temperature is maintained at approximately 78° C. and an excess of acetylene is passed in. A vigorous reaction ensues, with liberation of heat. Part of the acetic acid is carried over by the escaping excess of acetylene and is returned to the reaction vessel by suitable condensation or other arrangement and the vinyl acetate carried over is condensed and removed from the sphere of reaction. The unchanged acetylene may also be returned to the reaction vessel. This is continued until the rate of conversion slackens appreciably, due to the reduction of the mercury salt. It is then necessary to renew the catalyst to make the reaction continuous. Fresh acetic acid is now treated as already described for the production of the mercury ortho-phosphate catalyst, the acetic acid being in excess but not necessarily as great excess as when first making up the reaction liquor, and sufficient acetylene is passed into this mixture at a temperature of approximately 78° until vinyl acetate starts to form. This admixture of active catalyst and glacial acetic acid is now fed into the reaction kettle, either continuously or intermittently, so that the reaction for the formation of vinyl acetate proceeds in a continuous or normal manner. A portion of the reduced catalyst or sludge suspended in the reaction liquor is removed from time to time from the reaction kettle in order to maintain the activity and concentration of the reaction liquor approximately constant.

Since in the reduction of the mercury salt as outlined above a certain amount of phosphoric acid is liberated, the active catalyst, therefore, prepared and to be added to the reaction kettle should not contain any excess of phosphoric acid, the phosphoric acid added to precipitate the mercury acetate being only that sufficient to precipitate the mercury present. Sufficient free acid is liberated from the catalyst to maintain a high rate of reaction. Other carboxylic acids than acetic, such as formic, propionic, etc., may be utilized in the same manner and the process operated continuously.

In the foregoing description and following claims, the word "dissolved" used in reference to mercury oxide is used, as is customary in such cases, in a broad sense to indicate the appearance of solution, it being well known that mercury oxide is in fact insoluble in the acids but reacts readily therewith to produce a soluble salt.

Having thus described my invention, what I claim is:—

1. A method of rendering continuous the production of vinyl esters from the corresponding carboxylic acids by interaction of acetylene and carboxylic acids in presence of mercury salts of ortho-phosphoric acid, which comprises removing exhausted catalyst from the reaction mass and replacing the same in the reaction mass with a catalyst prepared by treating a similar catalyst in suspension in the same kind of carboxylic acid used with acetylene to a point where formation of vinyl esters commences.

2. A continuous process of making vinyl esters from the corresponding carboxylic acids, which comprises dissolving an oxide of mercury in the carboxylic acid to be treated, reacting on the dissolved oxide with ortho-phosphoric acid, passing acetylene into the liquor until reaction slackens, through exhaustion of catalyst, reacting on a mercury oxide dissolved in fresh carboxylic acid of the sort used in the main reaction with a sufficient amount of ortho-phosphoric acid for conversion of the oxide to phosphate, passing acetylene into the fresh acid and phosphate until vinyl ester formation commences, and substituting the fresh catalyst for that which has been exhausted.

3. A continuous process of making vinyl esters from the corresponding carboxylic acids, which comprises dissolving an oxide of mercury in the carboxylic acid to be treated reacting on the dissolved oxide with a molecular excess of ortho-phosphoric acid, passing acetylene into the liquor until reaction slackens, through exhaustion of catalyst, reacting with a molecular equivalent of ortho-phosphoric acid on a mercury oxide dissolved in fresh carboxylic acid of the sort used in the main reaction, passing acetylene into the fresh acid and phosphate until vinyl ester formation commences and substituting the fresh catalyst for that which has been exhausted.

4. A method of rendering continuous the production of vinyl acetate by interaction of acetylene and acetic acid in presence of mercury salts of ortho-phosphoric acid, which comprises removing exhausted catalyst from the reaction mass and replacing the same in the reaction mass with a catalyst prepared by treating a similar catalyst in suspension in acetic acid with acetylene to a point where formation of vinyl acetate commences.

5. A continuous process of making vinyl acetate, which comprises dissolving an oxide of mercury in acetic acid, reacting on the dissolved oxide with ortho-phosphoric acid, passing acetylene into the liquor until reaction slackens, through exhaustion of catalyst, reacting with ortho-phosphoric acid on a mercury oxide dissolved in fresh acetic acid, passing acetylene into the fresh acid and phosphate until vinyl acetate formation commences, and substituting the fresh catalyst for that which has been exhausted.

6. As a substitute or renewal catalyst for the manufacture of vinyl esters by interaction of acetylene and corresponding carboxylic acids, mercury salts of ortho-phosphoric acid treated externally of the main reaction with acetylene while in suspension in carboxylic acid of the sort used in the reaction and until vinyl ester formation commences.

7. As a substitute or renewal catalyst for the manufacture of vinyl esters by interaction of acetylene and corresponding carboxylic acids, the conversion product resulting from interaction of acetylene and a mercury salt of ortho-phosphoric acid in carboxylic acid of the sort used in ester manufacture.

In witness whereof, I have hereunto set my hand.

GEORGE O. MORRISON.